April 18, 1967  H. P. MOYER ET AL  3,314,094
DOCKBOARD
Filed Sept. 21, 1964  3 Sheets-Sheet 3
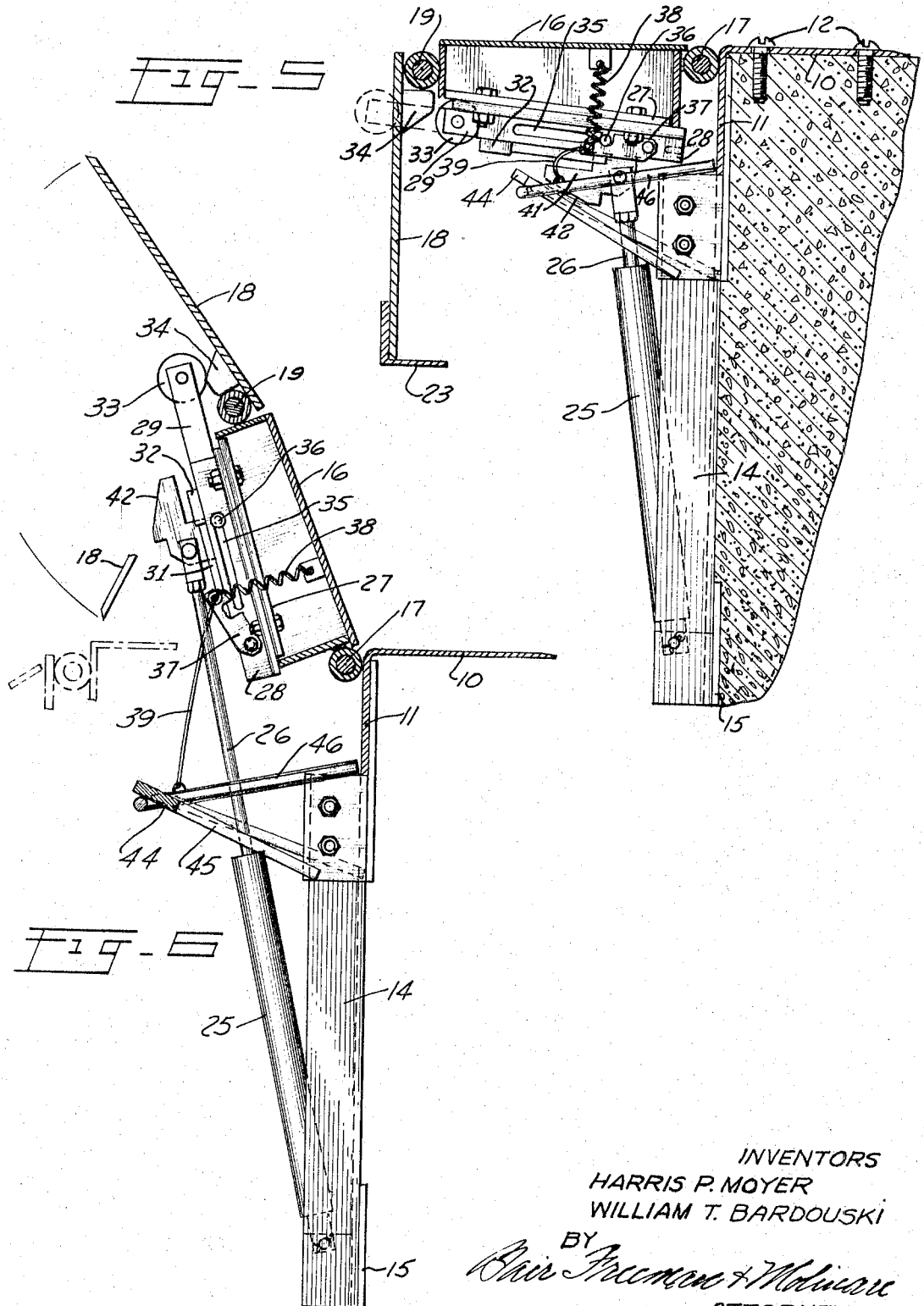
INVENTORS
HARRIS P. MOYER
WILLIAM T. BARDOUSKI
BY
ATTORNEYS

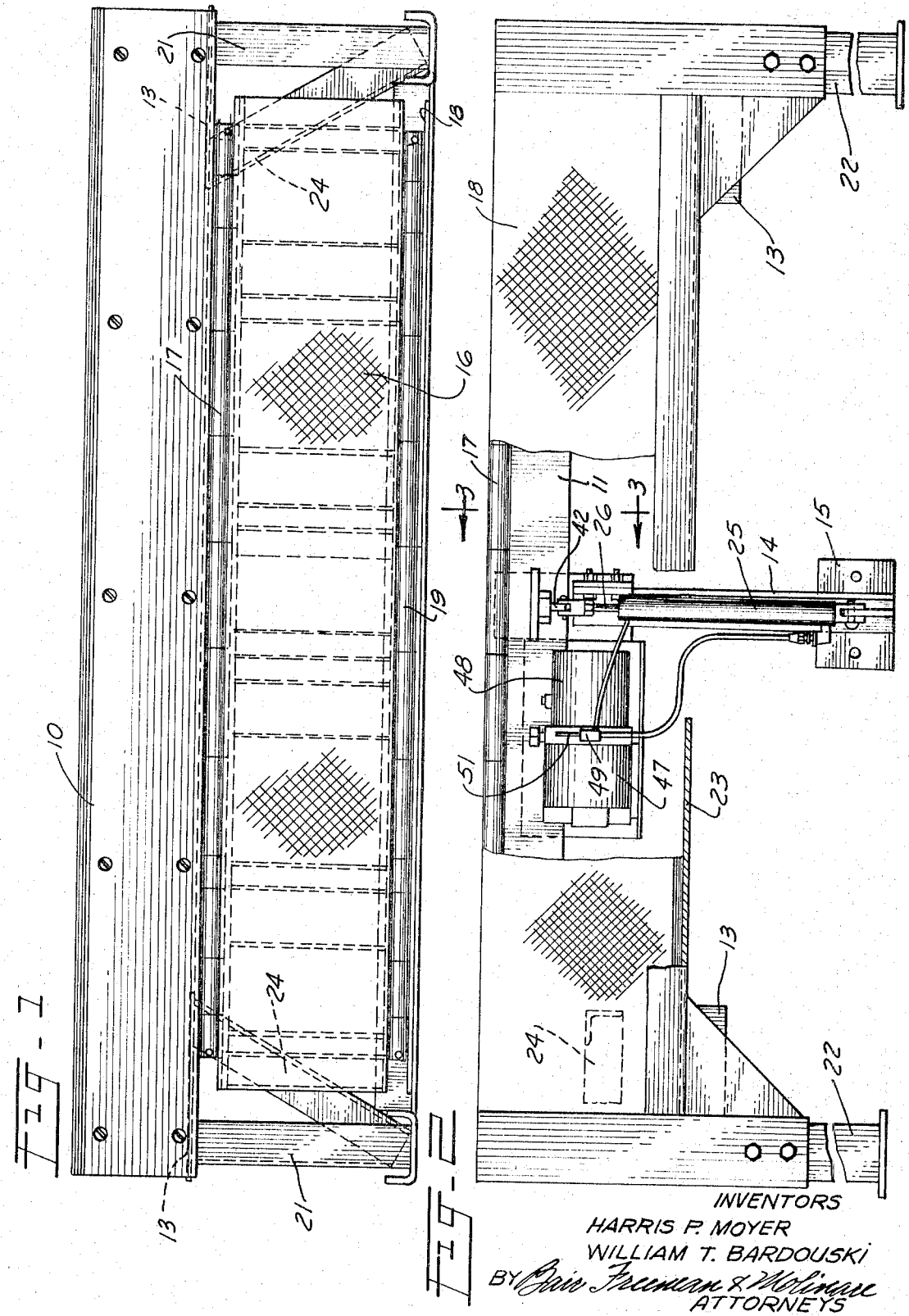

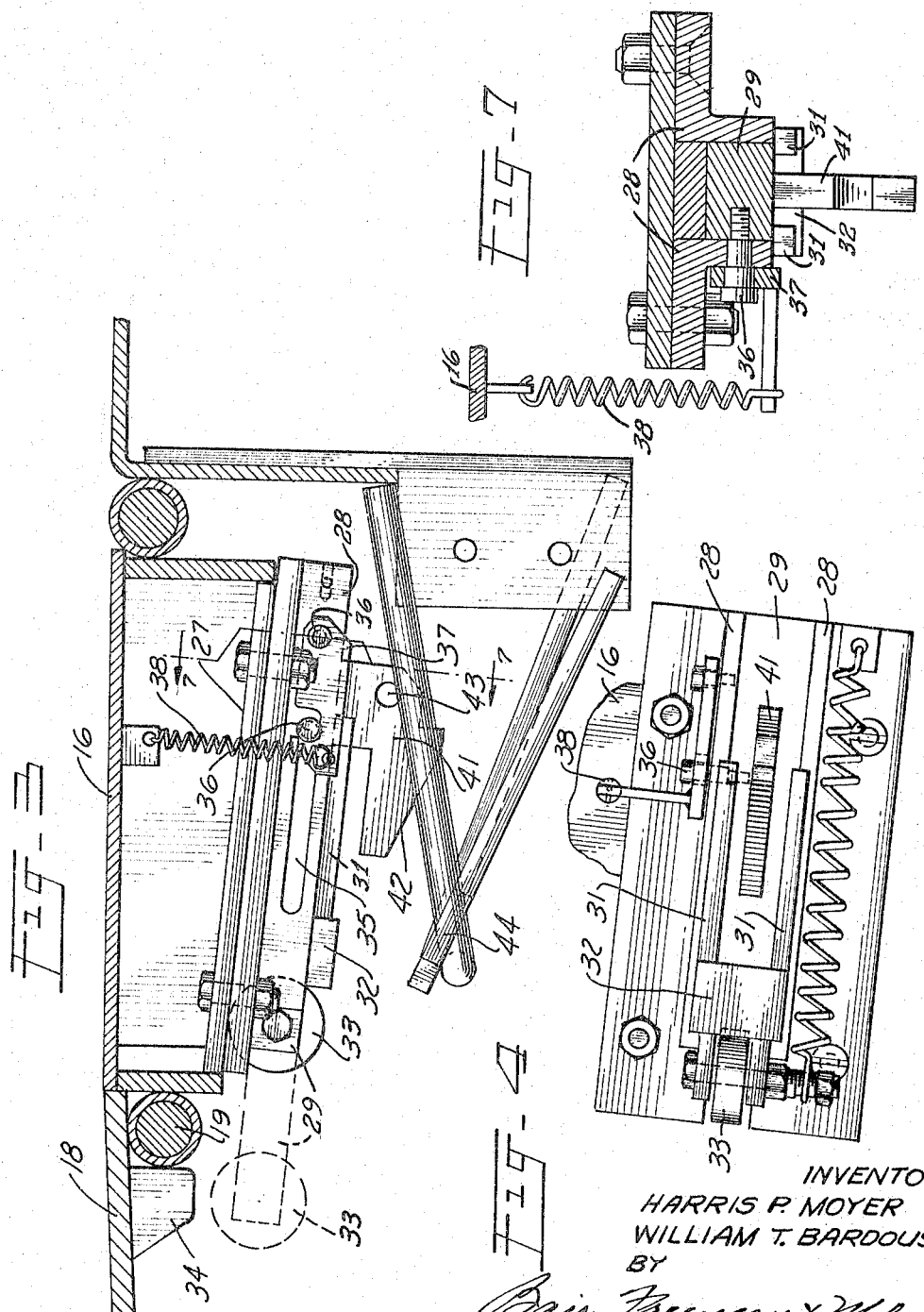

United States Patent Office 3,314,094
Patented Apr. 18, 1967

3,314,094
DOCKBOARD
Harris P. Moyer, Deerfield, and William T. Bardouski, Sterling, Ill., assignors to Unarco Industries, Inc., Chicago, Ill., a corporation of Illinois
Filed Sept. 21, 1964, Ser. No. 397,901
8 Claims. (Cl. 14—71)

This invention relates to dockboards and more particularly to dockboards of the type having a hinged lip to span the space between a dock and a truck bed and which lip is folded to a depending position when not in use.

Dockboards as heretofore constructed have been set into a recess in a dock normally terminating flush with the front of the vertical wall of the dock and with a hinge lip thereon being extensible to span the space between the dock and the truck bed. Such boards are commonly raised by a spring mechanism with a manually releasable hold down being provided to prevent the bar from moving up except when desired.

Also normally the boards are provided with means actuated by raising of the board to swing the lip up to its extended position so that when the board is subsequently walked down the lip will engage the bed of a truck in front of the dock.

Boards of this type do not lend themselves to installation on existing docks due to the necessity of forming a recess in the dock of the proper size and shape to receive the dockboard. Such dockboards also frequently extend into a warehouse space and may be undesirable for this reason. Additionally the mechanism for raising the board and the lip tends to become somewhat complex and difficult to keep in proper adjustment for the desired operation.

It is accordingly an object of the present invention to provide a dockboard which can easily be installed on existing or new docks without requiring any recesses or openings in the dock itself.

According to a feature of the invention, the dockboard is relatively short and is hinged on a mounting plate which fits on the edge portion of the dock itself. Bumpers preferably extend beyond the board to prevent a truck from backing into and damaging the board and are preferably connected to a vertical frame which carries a cross piece to engage the lip when it is in its depending position thereby to hold the board in a horizontal position.

According to an important feature of the invention, an extensible actuating device, such as a fluid cylinder and piston type motor, is connected to a movable member on the board so that when the motor is extended the board will first be swung upwardly and the movable member will then be moved relative to the board to raise the lip. Preferably the movable member is a slidable bar carried by the board which is latched in a retracted position until the bar is raised and which is then released to slide out and swing the lip upwardly to its extended position. Cam members are preferably provided on the sliding bar and on a stationary part of the frame to retract the sliding bar when the board is moved downwardly to a lowered position.

The above and other objects and features of the invention will be more readily apparent from the following description when read in connection with the accompanying drawings, in which:

FIG. 1 is a top plan view of a dockboard embodying the invention;

FIG. 2 is a front elevation with parts of the lip broken away and parts in section;

FIG. 3 is an enlarged partial section on the line 3—3 of FIG. 2 with the lip extended and the piston rod omitted for clarity;

FIG. 4 is a bottom view of the mechanism shown in FIG. 3;

FIG. 5 is a side view showing the board in horizontal position;

FIG. 6 is a view similar to FIG. 5 with parts in section showing the board in raised position; and FIGURE 7 is a partial section on the line 7—7 of FIGURE 3.

The dockboard, as shown, comprises a mounting plate which, as best seen in FIGS. 5 and 6, is in the form of an angle strip having a horizontal flange 10 adapted to overlie and be secured to the top surface of the dock and a vertical flange 11 to overlie and be secured to the forward wall of the dock. As shown in FIG. 5, the horizontal flange 10 may be secured to the upper surface of the dock by fastenings, indicated generally at 12, to secure it permanently in place on the dock.

The vertical flange 11 carries at its ends mounting plates 13 and at its center carries a vertically extending bracket 14. Preferably a plate 15 is secured to the lower end of the bracket 14 and may be fastened to the vertical surface of the dock by suitable bolts or similar fastenings.

A dockboard, shown at 16, is hinged to the mounting plate on a horizontal hinge 17 located adjacent to the junction of the horizontal and vertical flanges of the mounting plate. The board, as shown, is relatively short so that it will project outwardly from the dock a relatively short distance on the order of twelve to eighteen inches. At its free edge the board carries a lip 18 hinged to the board by a hinge 19 to swing from a depending position, as shown in FIG. 5, to a raised position forming substantially an extension of the board, as shown in FIG. 6.

In order to protect the board and the lip when the lip is in its horizontal non-use position, forwardly projecting bumpers 21 are carried by the mounting plate at the opposite ends of the board and preferably project slightly beyond the outer end of the board and the lip. The bumpers are connected to the end plates 13 and further include vertically extending legs 22 which engage the ground or floor surface in front of the dock. A cross beam 23, which is shown as an angle bar, is supported between the legs 22 and constitutes therewith and with the bumpers a frame for assisting in supporting the board and the mechanism. The cross beam 23 is so positioned, as shown in FIGS. 2 and 5, that when the board is in its horizontal position and the lip is depending, the lip will rest on the cross beam 23 to support the board against swinging further downward. Suitable angle braces, as shown at 24 in FIG. 1, may be provided extending between the outer edges of the bumpers and the plates 13 to provide lateral stability for the bumpers.

The board is adapted to be raised by an extensible actuating apparatus which is shown as a cylinder 25 having a piston therein whose piston rod 26 projects beyond the end of the cylinder. The lower end of the cylinder 25 is pivoted to the lower end of the bracket 14 on a horizontal axis. The upper end of the piston rod 26 is connected to mechanism carried by the board which functions when the piston rod is extended first to swing the board to a raised position and thereafter to swing the lip to its upper extended position.

This mechanism, as best seen in FIGS. 3 and 4, comprises a frame 27 mounted on the lower surface of the board and projecting upwardly and forwardly at a slight angle thereto. The frame 27 carries guide strips 28 spaced apart and defining between them a trackway or passage for a slide bar 29. As shown, the guide strips 28 are angle strips mounted with one flange of each strip extending vertically and spaced apart to recieve a slide bar between them and with retainer strips 31 secured to the edges of the guide strips and projecting inwardly therebeyond to confine the slide bar. A cross plate 32 is preferably secured at one end of the guide strips to assist in confining the slide bar and to limit the motion thereof. The slide bar preferably carries a roller 33 at its outer end which is movable beneath a hinge bracket 34 on the lip, as shown in FIG. 6, to swing the lip upwardly to a position in which it forms an extension of the dockboard. Preferably also one of the guide members 28 is formed with an elongated slot 35 therein through which a pin 36 connected to the slide bar extends for guiding and limiting movement of the slide bar and also for cooperation with latching means to be described hereinafter.

The slide bar is normally held in its retracted position by a pivoted latch member 37 formed with a notch near one end thereof to recive the pin 36, as shown in FIG. 3. A spring 38 normally urges the latch member upwardly toward its latching position. To move the latch downwardly for permititng the slide bar to be moved forward, a tension element, such as a wire or cable 39, is connected to the free end of the latch and to a fixed member on the frame, shown as one of the arms 46 described hereinafter, so that when the dockboard is swung upwardly the tension member will move the latch downward to release the pin 36 and permit the slide bar to slide forwardly.

The slide bar has connected thereto a downwardly extending cam plate 41 which, as best seen in FIG. 3, has an angularly extending lower cam surface 42 and which is provided at its rear end with an opening 43 for connection to the upper end of the piston rod 26. The cam projection is preferably cut out at its forward end, as shown in FIG. 3, so that it can pass at least partially over the cross plate 32 when the slide bar is moved forwardly. The cam plate is adapted to cooperate with a cam strip 44, as best seen in FIGS. 5 and 6, which is carried by arms 45 extending upwardly and outwardly from the bracket 14 and cooperating arms 46 extending downwardly and outwardly from the bracket 14. The cam strip 44, as shown, is held at an angle complementary to the cam surface 42 of the cam and is relatively short so that the cam strip will engage it when the dockboard is swung downwardly but will pass over it after the dockboard has moved below a level positon to permit further downward swinging of the dockboard.

Fluid under pressure for operating the fluid motor 25–26 may be supplied either from a hand-operated pump or from a power operated pump. As shown, a pump 47 driven by an electric motor 48 supplies the actuating fluid for the extensible guiding means. The pump preferably receives fluid from a sump or storage tank associated therewith and is connected through a valve 49 with the opposite ends of the cylinder 25. Reversal of the fluid motor operation can be effected either by reversing the motor 48 and pump 47 or by making the valve 49 a reversible valve. The valve may be controlled manually through an actuating rod 51 partially shown in FIG. 2 and which may extend to a conveniently positioned actuating handle projecting above the dockboard and preferably at one side thereof for convenient operation by an operator. The motor is preferably de-energized and may be energized through a switch operated by movement of the control handle to move the valve.

With the dockboard in its normal stored position, as shown in FIG. 5, the lip engages the cross bar 23 to support the dockboard in a horizontal position so that it can support the weight of a person walking onto it or a truck which is driven on it. When a truck to be loaded backs into the dock it will back up until the rear edge of the truck bed engages the bumpers 21. At this time, the operator may operate the control handle to start the pump driving motor 48 and to move the valve 49 to a position to supply actuating fluid to the lower end of the cylinder 25. At this time, the piston rod 26 will be pushed upward toward its extended positon shown in FIG. 6.

During initial movement of the piston rod the latch 37 will remain engaged with the pin 36 and will hold the slide bar 29 against outward movement. At this time, therefore, the dockboard will be swung upwardly about its hinge 17 toward the raised position shown in FIG. 6. When the dockboard is raised sufficiently to tension the cable 39 the latch 37 will be swung downward to release the pin 36 and permit the slide bar to be moved forwardly by further extension of the piston rod 26. As the slide bar moves forwardly the roller thereon will engage the plate 34 on the lip 18 and will swing the lip up to its partially extended position, as shown in FIG. 6.

At this time, the valve 49 may be reversed to cause the actuating means to retract and to permit the dockboard to swing downwardly. As the dockboard swings downwardly, when it reaches the level of the truck bed the lip 18 will engage the truck bed and will be supported thereon. Engagement of the lip with the truck bed will cause the lip to swing to its fully extended position as shown in FIG. 3. Continued retraction of the actuating means will pull the slide bar 29 back to its retracted position at which the latch will again engage with the pin 36 to hold the slide bar retracted. The valve 49 may then be moved to a neutral positon to shut off the motor and to leave the dockboard free to float upwardly or downwardly, as required, by raising or lowering of the truck bed during loading or unloading of the truck. When the truck pulls away from the dock the lip 18 is free to swing downward to its depending position. If the dockboard is at an elevation such that the lip will engage the cross bar 23, the board may be left in its normal inactive position. However, if the dockboard is at a lower elevation such that the lip would pass over the front of the cross bar 23, the operator should again raise the dockboard sufficiently to permit the lip to come to rest on the cross bar 23 so that the board will be left in its normal stored position ready for subsequent use.

While one embodiment of the invention has been shown and described in detail, it will be understood that this is illustrative only and is not to be taken as a definition of the scope of the invention, reference being had for this purpose to the appended claims.

What is claimed is:

1. A dockboard for use with a dock having a flat upper surface and a vertical front wall comprising a mounting plate having a horizontal flange portion to rest on the flat upper surface of a dock and a vertical portion to overlie the front wall of a dock, a board hinged to the mounting plate to swing from a raised position angling upwardly to a lowered position angling downwardly, a lip hinged to the free edge of the board to swing from a depending position to an extended position in which it forms an extension of the board, an extensible and contractable motor having one part connected to the vertical portion of the mounting plate and another part arranged to provide a component of force for swinging the board between said lowered and raised positions, and means operatively associated with the board and connected to the other motor part and being movable relative to the board to both raise the board when the motor is extended and then to move relative to the board to swing the lip at least partially toward its extended position.

2. A dockboard for use with a dock having a flat upper surface and a vertical front wall comprising a mounting plate having a vertical flange to overlie the front wall of a dock, a board hinged to the mounting plate adjacent to the juncture of the upper surface and front wall to swing vertically, a lip hinged to the free edge of the board to swing from a depending position to an extended position substantially aligned with the board, an extensible and contractable motor connected at one end to the mounting plate below the flat upper surface of the dock, a slide bar slidably mounted on the board to which the other end of the motor is connected and which is slidable into engagement with the lip to swing it at least partially to its extended position, a latch to hold the slide bar in a retracted position in which the lip can move to its depending position, and means operated by swinging of the board to a raised position to release the latch.

3. The dockboard of claim 2 including cooperating cam parts on the slide bar and mounting plate to move the slide bar to its retracted position when the dockboard is swung down to a generally horizontal position.

4. A dockboard comprising a supporting frame, a board pivoted at one edge on the frame for vertical swinging, a lip hinged to the free edge of the board to swing from a depending position to an extended position forming an extension of the board, an extensible operating device connected at one end to the frame and arranged to provide a component of force for swinging the board, and lip operating means on the board movable relative to the board to which the other end of the operating device is connected, the operating device when extended both swinging the board to a raised position and moving said lip operating means to swing the lip to its extended position.

5. A dockboard comprising a supporting frame, a board pivoted at one edge on the frame for vertical swinging, a lip hinged to the free edge of the board to swing from a depending position to an extended position forming an extension of the board, an extensible operating device connected at one end to the frame and operating to selectively raise the board, a slide bar slidably mounted on the board and slidable from a retracted position, in which it frees the lip to swing downwardly, to an extended position in which it engages the lip and swings it at least partially to its extended position, the other end of the operating means being connected to he slide bar and being operative to both raise the board and move the slide bar between said positions.

6. A dockboard comprising a supporting frame, a board pivoted at one edge on the frame for vertical swinging, a lip hinged to the free edge of the board to swing from a depending position to an extended position forming an extension of the board, an extensible operating device connected at one end to the frame, a slide bar slidably mounted on the board and slidable from a retracted position in which it frees the lip to swing downwardly to an extended position in which it engages the lip and swings it at least partially to its extended position, the other end of the operating means being connected to the slide bar, a latch to hold the slide bar in its retracted position, and means operated by elevation of the board to a predetermined position to release the latch.

7. The dockboard of claim 6 including cam parts on the slide bar and the frame which engage to move the slide bar from its extended to its retracted position when the board is swung downwardly.

8. The dockboard of claim 6 including a cam member on the slide bar and a stationary cam part carried by the frame and which is relatively short lengthwise of the dockboard, the cam member engaging the cam part to move the slide bar to its retracted position when the board is swung downward to a generally horizontal position and passing beyond the edge of the cam part as the board continues to move down whereby the board can be swung below a horizontal position.

References Cited by the Examiner
UNITED STATES PATENTS

| | | | |
|---|---|---|---|
| 2,644,971 | 7/1953 | Rowe | 14—71 |
| 2,714,735 | 8/1955 | Watson | 14—71 |
| 3,117,332 | 1/1964 | Kelley | 14—71 |
| 3,167,796 | 2/1965 | Layne | 14—71 |
| 3,201,814 | 8/1965 | Le Clear | 14—71 |
| 3,204,270 | 9/1965 | Fenton | 14—71 |
| 3,235,896 | 2/1966 | Riggs | 14—71 |

JACOB L. NACKENOFF, *Primary Examiner*.